United States Patent
Hustedt et al.

(10) Patent No.: US 10,411,632 B2
(45) Date of Patent: Sep. 10, 2019

(54) ALTERNATOR WITH HARMONIC COMPENSATION

(71) Applicant: KSR IP Holdings, LLC, Wilmington, DE (US)

(72) Inventors: Eric Hustedt, Halifax (CA); Pacifique Maisha, Halifax (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 15/896,996

(22) Filed: Feb. 14, 2018

(65) Prior Publication Data

US 2018/0234043 A1    Aug. 16, 2018

Related U.S. Application Data

(60) Provisional application No. 62/458,751, filed on Feb. 14, 2017.

(51) Int. Cl.
*H02P 21/00* (2016.01)
*H02P 21/08* (2016.01)
(Continued)

(52) U.S. Cl.
CPC .............. *H02P 21/08* (2013.01); *H02P 21/06* (2013.01); *H02P 29/50* (2016.02)

(58) Field of Classification Search
CPC ........... H02P 21/08; H02P 29/50; H02P 21/06
(Continued)

(56) References Cited

U.S. PATENT DOCUMENTS

| 6,683,428 B2 | 1/2004 | Pavlov et al. |
| 8,729,839 B2 | 5/2014 | Suzuki et al. |

(Continued)

FOREIGN PATENT DOCUMENTS

| EP | 2747273 A1 | 6/2014 |
| JP | 2012105406 A | 5/2012 |
| KR | 20140073141 A | 6/2014 |

OTHER PUBLICATIONS

Texas Instruments Europe, Field Orientated Control Of 3-Phase AC-Motors, Literature No. BPRA073, Feb. 1998, 24 pages.
(Continued)

*Primary Examiner* — Erick D Glass
(74) *Attorney, Agent, or Firm* — Dinsmore & Shohl LLP (57) ABSTRACT

A system for detecting and eliminating harmonic effects in the DQ plane of the non-sinusoidal back EMF voltages is provided. The system is a field oriented controller (FOC) that includes a poly-phase electric machine, proportional-integral-derivative controllers and a microcontroller. The microcontroller not only analyzes a stator current but analyzes a back electromotive force (BEMF) voltages to extract flux vectors of the EMF. These vectors have distortions as a result of the geometries and saturation effects inherent in the electrical machine. Therefore, the microcontroller corrects these defects by transmitting the BEMF vectors and the machine operating points, including the current rotational speed and current, into the algorithm, which in turn develops a command voltage in the DQ frame for the specific operating point. This command voltage is inserted into the control output of the current PI controller so to prevents the non-sinusoidal back EMF voltages from generating non-sinusoidal currents.

19 Claims, 5 Drawing Sheets (51) Int. Cl.
*H02P 21/06* (2016.01)
*H02P 29/50* (2016.01)

(58) Field of Classification Search
USPC .................................................... 318/400.02
See application file for complete search history.

(56) References Cited

U.S. PATENT DOCUMENTS

| | | | |
|---|---|---|---|
| 2004/0100220 A1* | 5/2004 | Fu | B60L 15/00 318/700 |
| 2004/0107973 A1* | 6/2004 | Atwell | A24D 3/02 131/342 |
| 2007/0107973 A1* | 5/2007 | Jiang | B62D 5/046 180/443 |
| 2007/0158132 A1* | 7/2007 | Ta | B62D 5/046 180/446 |
| 2009/0167224 A1 | 7/2009 | Miura et al. | |
| 2014/0139155 A1 | 5/2014 | Deshamais | |
| 2014/0159624 A1 | 6/2014 | Ko | |

OTHER PUBLICATIONS

Sunitha, et al., Elimination Of Harmonics Using Active Power Filter Based On DQ Reference Frame Theory, International Journal of EngineeringTrends and Technology (IJETT)—vol. 4 Issued Apr. 4, 2013, pp. 781-785.

\* cited by examiner

ALTERNATOR WITH HARMONIC COMPENSATION

CROSS REFERENCE

The present utility patent application claims priority benefit of the U.S. provisional application for patent Ser. No. 62/458,751, filed on Feb. 14, 2017, under 35 U.S.C. 119(e).

TECHNICAL FIELD

The present specification generally relates to a system having harmonic compensation and, more specifically, to a system that analyzes back electromotive forces to correct harmonics in poly-phase electric machines.

BACKGROUND

Automotive alternators have been traditionally limited to use as pure electric generators where a voltage regulator modulates a small field current to produce a constant DC output voltage. Today, in addition to regular generating function these machines can also be used as motors to provide torque for tasks such as driving assist or engine starting. Voltage regulation as well as other motor functions are now a function of an inverter system known as an ECU (Electronic Control Unit). To realize these additional functions many alternators now utilize field oriented control (FOC) to regulate the torque production of an alternator to produce the constant output voltage in generating mode, or a torque demand when in motor mode. The FOC transforms the stator sinusoidal current of a three phase motor as two orthogonal components which can be identified as a vector. The measured phase current is converted to vectors in the coordinate system in the DQ frame. The d-axis component of the stator current vector is used to control the rotor flux linkage and the q-axis component is used to control the motor torque. Decoupled torque and flux currents can be derived for control algorithms development. Controllers such as proportional and integral controller (PI controller) are then used to regulate the phase current with a loop feedback mechanism.

However, some poly-phase electric machines tend to develop a non-sinusoidal back electromotive (BEMF) voltage, especially lower cost claw pole type alternators. These alternators are being adapted for use in automotive start-stop systems, mild/micro hybrid applications, as well as generating. The BEMF voltages are non-sinusoidal and thus contain harmonics of a higher order than the motor fundamental frequency. Due to the nature of the FOC, these harmonics appear in the DQ plane as an AC component frequency shifted by N−1, where N indicates the harmonic order. These harmonics create controllability problems for the control algorithms as they can easily exceed the loop bandwidth. Simple PI controller tuning cannot give adequate performance over the full operating rpm range of the machine due to bandwidth limits inherent with PI controls.

Accordingly, it would be advantageous to have a system which could predict and eliminate the effect in the DQ plane of the non-sinusoidal BEMF voltages.

SUMMARY

In one embodiment, a system for correcting harmonic distortions in a n output from an electrical machine that produces a first electrical output is provided. The system further includes a pair of proportional-integral-derivative controllers, and a microcontroller having a correction model and an algorithm. The pair of proportional-integral-derivative controllers receive the first electrical output, the proportional-integral-derivative controllers having a second electrical output. The microcontroller is configured to receive a machine current vector from the electrical machine and the first electrical output. The microcontroller correlates the correction model table based on the machine current vector and the first electrical output. The microcontroller transmits a first feed forward term and a second feed forward term. The first feed forward term and the second feed forward term are inserted into the second electrical output of the pair of proportional-integral-derivative controllers such that the correction voltage transmitted by the microcontroller into the second electrical output eliminates the harmonics in the electrical machine.

In another embodiment a method for determining a model table is provided. The method includes analyzing, by a microcontroller, a rotor position signal, a rotor flux position signal and a rotor torque signal in the DQ plane, and a field current. Next, capturing a back electromotive force of one electrical cycle sample at a known rotating speed in conjunction with the field current over a predetermined sample rate. Then determining, by microcontroller, from the sample, a harmonic content of the back electromotive force. The method continues by performing a direct-quadrature-zero transformation using the rotor position signal which reveals a plurality of harmonics remaining in the DQ reference frame and removing the machine fundamental frequency such that only the plurality of harmonics remaining in the DQ reference frame. The plurality of harmonics remaining in the DQ reference frame are transformed by a correction algorithm of the microcontroller such that the model table is populated with the rotor position signal and two voltage values that correspond to the plurality of harmonics remaining in the DQ reference frame for that specific rotor position.

In another embodiment, a method for correcting harmonics in an electrical machine is provided. The method includes analyzing, by a controller, a stator current and a back EMF voltages. Next, a pair of flux vectors of a back electromotive force indicating the rotation of the electrical machine and the machine speed are extracted. Then the distortions from the geometries and saturation effects are determined. Then the pair of flux vectors of the back electromotive force into an algorithm are transmitted by the microcontroller. Next, a command voltage in a DQ frame that correlates to the pair of flux vectors of the back electromotive force is developed. Then the command voltage, by the controller, is inserted into a control output of a current proportional-integral-derivative controller as a correction signal. The correction signal prevents the back electromotive force voltages from generating a non-sinusoidal current over the operating range of the machine thereby maintaining the controlling quantities for a proportional-integral-derivative controller loops in the DQ plane as DC values.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
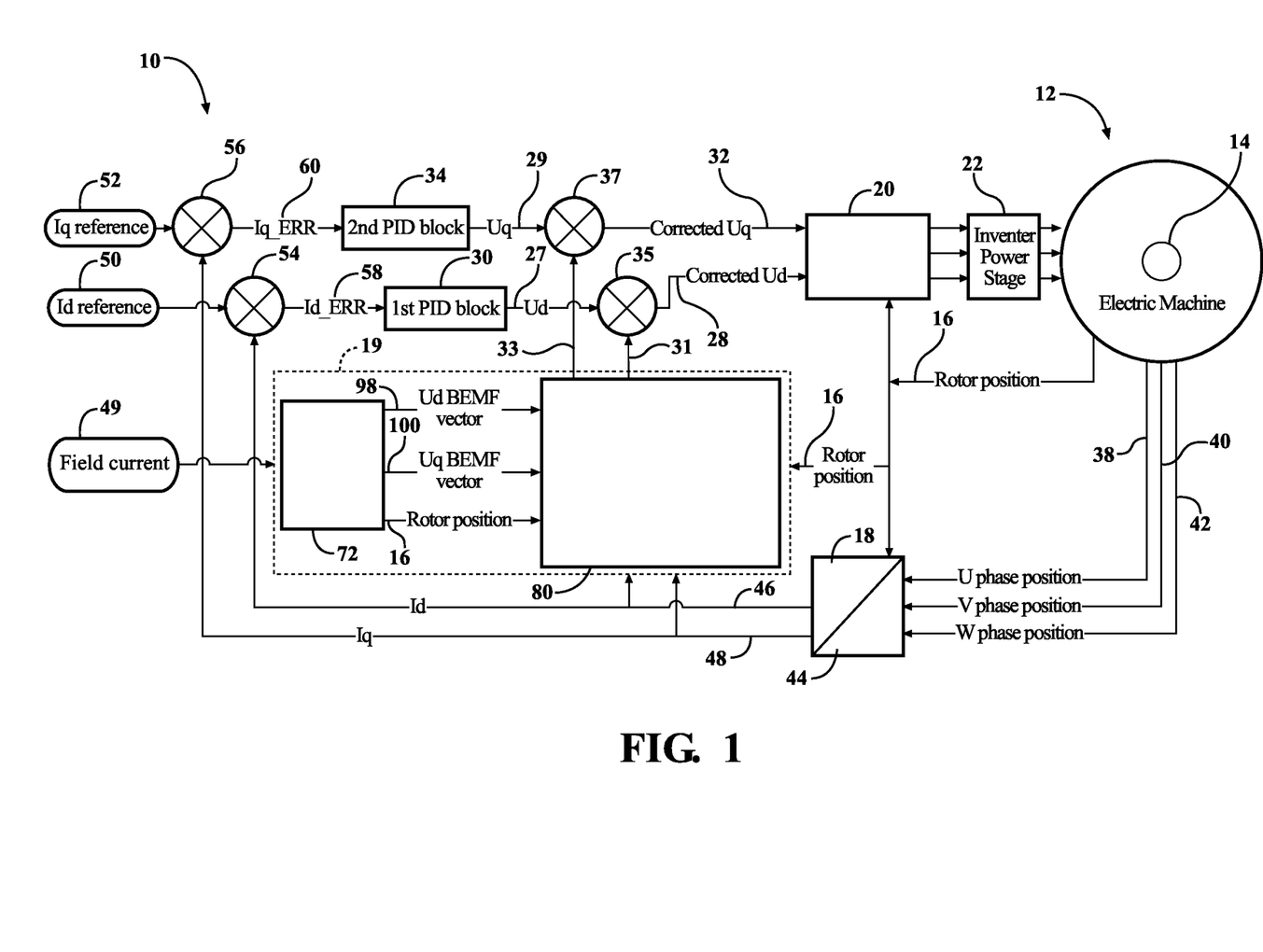
FIG. 1 schematically depicts an example field oriented control system schematic according to one or more embodiments described herein.

FIG. 1 generally depicts a system for detecting and eliminating harmonic effects in the DQ plane of the non-sinusoidal back electromotive force (BEMF) voltages is provided. The system is a field oriented controller (FOC), which includes a poly-phase electric machine, proportional-integral-derivative controllers and a microcontroller. The microcontroller not only analyzes a rotor flux position but also analyzes the BEMF voltages to extract flux vectors of the EMF. These vectors have distortions as a result of the geometries and saturation effects inherent in the synchronous poly-phase electrical machines. As a result of extracting the BEMF voltages and knowing the rotor flux positioning, a correction algorithm within the microcontroller corrects these defects by transmitting the BEMF vectors and the machine operating points, including the current rotational speed and current, into the algorithm, which in turn develops a command voltage in the DQ frame for the specific operating point. This command voltage is inserted into the control output of the current proportional and integral controller (PI controller) so to prevent the non-sinusoidal BEMF voltages from generating non-sinusoidal currents.

Referring now to FIG. 1, an example field oriented control circuit schematic is schematically depicted. The FOC control system 10 includes an synchronous poly-phase electric machine 12, such as an alternator. It should be appreciated that an asynchronous motor with a squirrel cage rotor may replace the synchronous poly-phase electric machine 12. The poly-phase electric machine 12 includes a stator (not shown) and a rotor 14. A power stage inverter 22 is communicatively coupled to the poly-phase electric machine 12 such that the power stage inverter 22 drives the poly-phase electric machine 12.

Still referring to FIG. 1, the FOC control system 10 further includes a Clarke transformation module 44 communicatively coupled to the poly-phase electric machine 12. The Clarke transformation module 44 is communicatively coupled to a Park transformation module 18. A first comparator 54 and a second comparator 56 and a microcontroller 19 are communicatively coupled to the Park transformation module 18. A field current signal 49 is communicatively coupled to the microcontroller 19. The first reference signal 50 is communicatively coupled to the first comparator 54 while a second reference signal 52 is communicatively coupled to the second comparator 56. The first comparator 54 is communicatively coupled to a first PI controller 30. The second comparator 56 is communicatively coupled to a second PI controller 34.

Still referring to FIG. 1, an output 27 of the first PI controller 30 is communicatively coupled to a first signal correction junction 35 and an output 29 of the second PI controller 34 is communicatively coupled to second signal correction junction 37. A first feed forward term 31, or first command voltage, is communicatively coupled from the microcontroller 19 to the first signal correction junction 35. A second feed forward term 33, or second command voltage, is communicatively coupled from the microcontroller 19 to the second signal correction junction 37. A first corrected output 28 from the first signal correction junction 35 and a second corrected output 32 from the second signal correction junction 37 are communicatively coupled to the inverse Park transformation module 20. The inverse Park transform module 20 is communicatively coupled to the power stage inverter 22.

Figure 2:
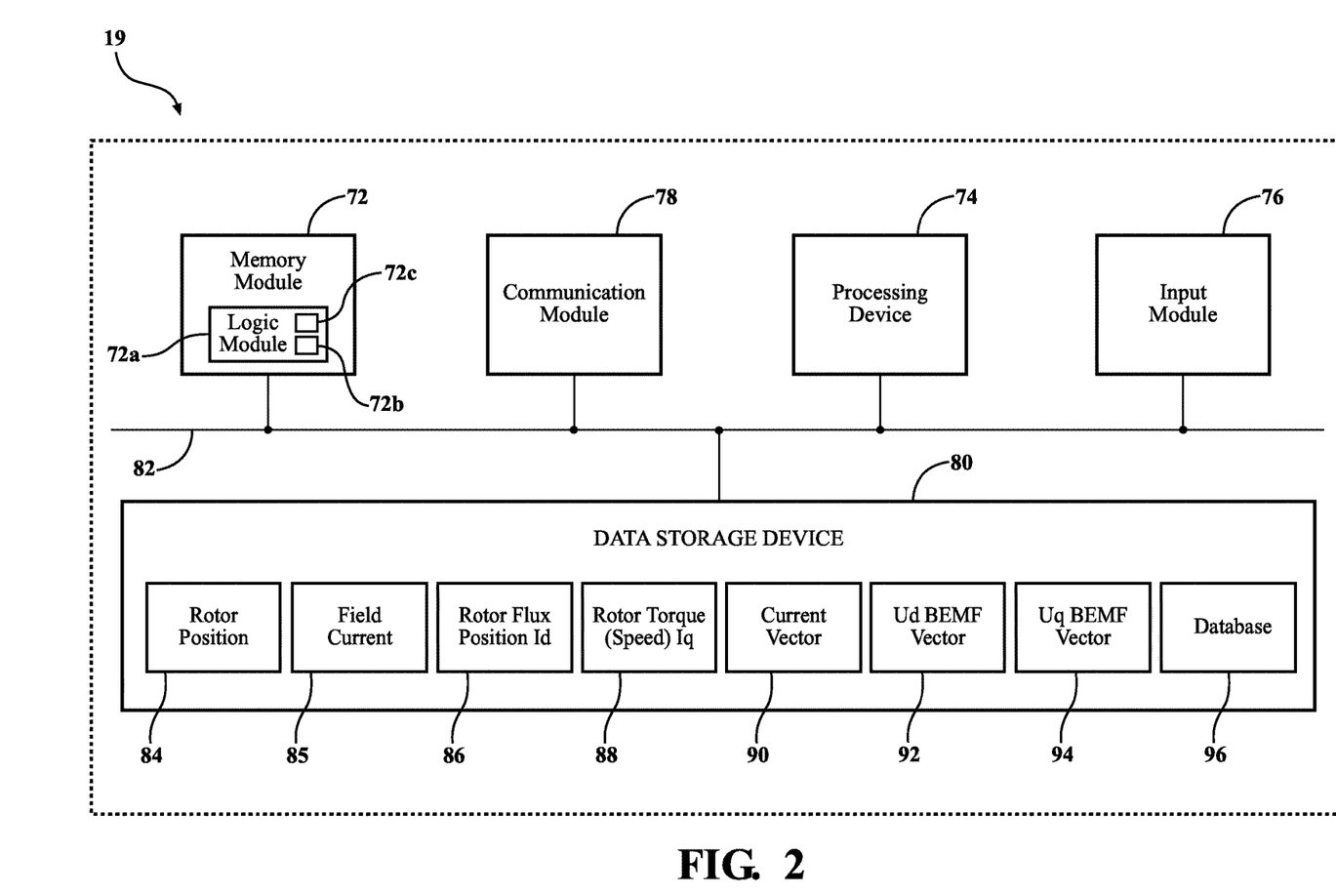
FIG. 2 schematically depicts a microcontroller of field oriented control system of FIG. 1 according to one or more embodiments shown and described herein.

Referring now to FIG. 2, a circuit schematic of the microcontroller 19 of the FOC control system 10 is schematically depicted. The components depicted in FIG. 2 include a memory module 72, a processing device 74, an input module 76, a communication module 78, and a data storage device 80. The components are interconnected by a communication path 82.

Still referring to FIG. 2, the communication path 82 may be formed from any medium that is capable of transmitting a signal such as, for example, conductive wires, conductive traces, optical waveguides, or the like. Moreover, the communication path 82 may be formed from a combination of mediums capable of transmitting signals. In one embodiment, the communication path 82 comprises a combination of conductive traces, conductive wires, connectors, and buses that cooperate to permit the transmission of electrical data signals to components such as processors, memories, sensors, input devices, output devices, and communication devices. The term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 82 communicatively couples the various components of the FOC control system 10. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 2, the processing device 74 may be any device capable of executing machine readable instructions. Accordingly, the processing device 74 may be a controller, an integrated circuit, a microchip, a computer, or any other computing device. The processing device 74 is communicatively coupled to the other components of the FOC control system 10 by the communication path 82. While the embodiment depicted in FIG. 2 includes only one processing device 74, other embodiments may include multiple processors communicatively coupled with one another by the communication path 82.

Still referring to FIG. 2, the input module 76 is communicatively coupled to the communication path 82 and communicatively coupled to the processing device 74. The input module 76 is capable of being communicatively coupled to the Park transform module 18, the field current 49, the poly-phase electric machine 12 and/or the data storage device 80. The input module 76 may receive a rotor position signal 16, a rotor flux component signal $I_d$ 46, a rotor torque signal $I_q$ 48, and/or the field current 49. The input module may convert the signals 16, 46, 48, 49 into electrical signals which are read by the processing device 74 and/or may convert the signals 16, 46, 48, 49 into a medium that the data storage device 80 can use to store the data, as discussed below.

Still referring to FIG. 2, the memory module 72 of the FOC control system 10 is coupled to the communication path 82 and communicatively coupled to the processing device 74. The memory module 72 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components capable of storing machine readable instructions such that the machine readable instructions can be accessed and executed by the processing device 74. The machine readable instructions may comprise logic or algorithm(s) written in any programming language of any generation, such as, for example, machine language that may be directly executed by the processor, or assembly language, object-oriented programming (OOP), scripting languages, microcode, etc., that may be compiled or assembled into machine readable instructions and stored on the memory module 72. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. The memory module 72 may include one or more programming instructions thereon that, when executed by the processing device 74, cause the processing device 74 to complete various processes, such as the process described herein with respect to FIG. 3.

Still referring to FIG. 2, the programming instructions stored on the memory module 72 may be embodied as a plurality of software logic modules 72a, where each logic module provides programming instructions for completing one or more tasks. For example, FIG. 2 schematically depicts the memory module 72 containing illustrative logic component 72a according to one or more embodiments shown and described herein. As shown in FIG. 2 the memory module 72 may be configured to store various processing logic, such as, for example, the model table 72b and the correction algorithm 72c. The model table 72b may contain a look-up table that includes measured data, which will be described in further detail below. The model table 72b may be configured to provide two voltage values based on the position of the rotor 14 and, if applicable, the field current 49, as will be described in greater detail below. Further, it should be appreciated that the correction algorithm 72c may contain an expression or a model that calculates these values rather than using measured data or that may be configured to read these value to generate the model table 72b and refer to the model table 72b when the appropriate correction is required. As such, the correction algorithm 72c may include an operating system and/or other software for determining, calculating, and/or correcting BEMF vectors 98, 100 as discussed in greater detail below.

Still referring to FIG. 2, the communication module 78 is coupled to the communication path 82 and communicatively coupled to the processing device 74. The communication module 78 may be any device capable of transmitting and/or receiving data via a network. Accordingly, the communication module 78 can include a communication transceiver for sending and/or receiving any wired or wireless communication. For example, the communication module 78 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the communication module 78 includes hardware configured to operate in accordance with the Bluetooth® wireless communication protocol. In some embodiments, the communication module 78 may be a wireless communication module configured to transmit and/or receive wireless signals according to the Bluetooth® 4.0 communication protocol. In such embodiments, the communication module 78 may transmit and receive signals using less energy than other less energy efficient wireless communication protocols. However, in some embodiments the communication module 78 is configured to transmit and/or receive wireless signals in accordance with a wireless communication protocol other than the Bluetooth® 4.0 communication protocol. Some embodiments may not include the communication module 78, such as embodiments that include a wired communication module for transmitting and/or receiving data via a wired network.

Still referring to FIG. 2, the data storage device 80, which may generally be a storage medium, may contain one or more data repositories for storing data that is received and/or generated. The data storage device 80 may be any physical storage medium, including, but not limited to, a hard disk drive (HDD), memory, removable storage, and/or the like. While the data storage device 80 is depicted as a local device, it should be understood that the data storage device 80 may be a remote storage device, such as, for example, a server computing device or the like.

Still referring to FIG. 2, a block diagram of various data contained within a storage device (e.g., the data storage device 80) of the FOC control system 10 is shown in and described herein. The data storage device 80 may include, for example, a rotor position data 84, a field current data 85, a rotor flux position data $I_d$ 86, a rotor torque data $I_q$ 88, a current vector data 90, a rotor flux BEMF $U_d$ data 92, a rotor torque BEMF $U_q$ data 94, and/or a database data 96.

Referring back to FIG. 1 and still referring to FIG. 2, the rotor position data 84 may be the rotor position 16 generated at the poly-phase electric machine 12 and transmitted to the microcontroller 19. The field current data 85 may be the field current 49, or angle, of the rotor 14. The rotor flux position data $I_d$ 86 and the rotor torque data $I_q$ 88 may be signals generated from the Park transformation module 18, shown as 46 and 48 respectively. The current vector data 90 may be a sum of the actual rotor flux position data $I_d$ and the rotor torque data $I_q$. The rotor flux BEMF $U_d$ data 92 may store data from, or related to, a rotor flux BEMF vector, shown as 98 and the rotor flux BEMF $U_d$ data 92 may store data from, or related to a torque BEMF vector, shown as 100, and further discussed with the method of FIGS. 3 and 5 below.

Referring to FIG. 2, the database data 96 may include, for example, data contained within for the model table 72b, such as, without limitation, the D harmonics, the Q harmonics, an observational graph and/or the like as will be described in greater detail below. In some embodiments, the database data 96 may work in conjunction with the model table 72b such that the D, Q harmonics stored in the database data 96 may be analyzed by the correction algorithm 72c and computed to populate the model table 72b such that, based on the rotor position 16 and, if applicable, the field current 49, the correction algorithm 72c of the microcontroller 19 provides a normalized value of the D and Q harmonic values at each rotor position, as described in further detail below.

It should be understood that the components illustrated in FIG. 2 are merely illustrative and are not intended to limit the scope of this disclosure. More specifically, while the components in FIG. 2 are illustrated as residing within the FOC control system 10, this is a non-limiting example. In some embodiments, one or more of the components may reside external to the FOC control system 10.

With reference back to FIG. 1, the system operation will now be described. In operation, the FOC control system 10 is configured to directly monitor the rotor 14, such as the rotor's flux position within the poly-phase electric machine 12. As such, the rotor position 16 is directly transmitted to the Park transformation module 18 and the inverse Park transformation module 20. A power stage inverter 22 drives the poly-phase electric machine 12 based on corrected inputs received from the inverse Park transformation module 20, as described in further detail below. The inverse Park transformation module 20 receives a corrected flux signal Ud, shown as 28, from the first signal correction junction 35. The inverse Park transformation module 20 receives a corrected torque signal Uq, shown as 32, from the second signal correction junction 37. The flux corrected signal Ud 28, the torque corrected signal Uq, the first signal correction junction 35 and the second signal correction junction 37 will also be described in greater detail below.

Still referring to FIG. 1, the poly-phase electric machine 12, depicted as a three phase AC motor, may generally apply three 120 degree spatially displaced sinusoidal voltages to three stator phases. As such, there may be a separate sinusoidal wave and a separate vector for each phase. The FOC control system 10 is generally known as a vector control scheme. That is, the FOC control system 10 is configured to control the stator currents represented by a particular vector. As depicted, the poly-phase electric machine 12 transmits a three phase output, a U phase current ($I_u$), a V phase current ($I_v$), and a W phase current ($I_w$), as shown at 38, 40, and 42 respectively. The currents $I_u$ 38, $I_v$ 40, and $I_w$ 42, which are attributable to the rotor speed and the three phase time, are transmitted from the poly-phase electric machine 12 into the Clarke transformation module 44.

Still referring to FIG. 1, the Clarke transformation module 44 is generally known to output a two coordinate time variant system ($\alpha$, $\beta$). Specifically, the two coordinate time variant system ($\alpha$, $\beta$) of the Clarke transformation module is a two dimension orthogonal system that still depends on time and speed. As such, the currents $I_u$, $I_v$, and $I_w$, shown at 38, 40, and 42 respectively, are transformed into the two coordinate time variant system ($\alpha$, $\beta$).

Still referring to FIG. 1, the transformed two coordinate time variant system output ($\alpha$, $\beta$) is transmitted to the Park transformation module 18, as the inputs for the Park transformation module 18. It should be understood that the Park transformation module 18 modifies the two phase orthogonal system ($\alpha$, $\beta$) in the d, q rotating reference frame. As such, the d coordinate may align with the rotor flux component for the current vector and the q coordinate may align with the torque component of the current vector. Therefore, the d, q components depend from the current vector ($\alpha$, $\beta$).

As such, the Park transformation module 18 provides current in the d, q rotating reference frame. Therefore, a rotor flux component $I_d$ and a rotor torque component $I_q$, shown as 46, 48 respectively, are transmitted from the Park transformation module 18.

Still referring to FIG. 1, in the DQ plane, the FOC control system 10 may compare the vectors in order to control the vectors using the first PI controller 30 and the second PI controller 34. In order for the FOC control system 10 to control the vectors, the FOC control system 10 may require two constants as input references: the rotor flux component $I_d$ 46 and the rotor torque component $I_q$ 48. As is generally known and appreciated in the art, the FOC control system 10 is generally based on these projections to makes the control accurate in both steady state and transient working modes.

Still referring to FIG. 1, a rotor flux reference $I_d$ 50, or flux command, and a rotor torque reference $I_q$ 52, or torque command, may be inputted into the FOC control system 10 as an output from, for example and non-limiting, a speed regulator (not shown) and a synchronous motor (not shown), such as a permanent magnet synchronous motor, respectively. The rotor flux component $I_d$ 46 is compared to the rotor flux reference $I_d$ 50 at the first comparator 54. The rotor torque component $I_q$ 48 is compared with the rotor torque reference $I_q$ 52 at the second comparator 56.

Still referring to FIG. 1, once the rotor flux component $I_d$ 46 is compared to the rotor flux reference $I_d$ 50, an $I_{d\ error}$ 58 is determined and transmitted to the first PI controller 30. The $I_{d\ error}$ 58 is the difference between the rotor flux reference $I_d$ 50 and the rotor flux component $I_d$ 46. Similarly, once the rotor torque component $I_q$ 48 is compared to the rotor torque reference $I_q$ 52, the $I_{q\ error}$ 60 is determined and transmitted to the second PI controller 34. The $I_{q\ error}$ 60 is the difference between the rotor torque reference $I_q$ 52 and the rotor torque component $I_q$ 48.

Still referring to FIG. 1, the first PI controller 30 and the second PI controller 34 regulate the torque and flux feedback to the desired values by using constant references. That is, the proportional portion of the PI controllers 30, 34 will attempt to correct the error between the set point and the measured output. The integral portion accumulates an error over time so to apply a correction to the error. The derivative portion is proportional to the speed of the system such that the output of the differentiator is applied to slow down the poly-phase electric machine 12. As such, the first PI controller 30 and the second PI controller 34 function, as part of a feedback system, to control the process of regulating motor currents.

In traditional systems, an output of the first PI controller 30, a controlled flux component signal $U_d$, shown as 27, and an output of the second PI controller 34, a controlled torque component signal $U_q$, shown as 29, are directly transmitted (not shown) to the inverse Park transformation module 20. However, as is generally known, the FOC control system 10 functions properly because it is assumed that the voltages and currents are pure sine waves. If the voltages and currents are not pure sine waves, the FOC control system 10 has difficulty in regulating a motor current. In poly-phase electric machines, there is a tendency to develop non-sinusoidal BEMF voltages. As such, non-sinusoidal BEMF voltages create controllability problems for the control algorithms. To combat the non-sinusoidal BEMF voltages, the microcontroller 19, having the correction algorithm 72c (FIG. 2), which may predict and eliminate the effect in the DQ plane of the non-sinusoidal BEMF voltages will now be discussed.

It should be generally understood that harmonics in the BEMF may be due to geometries in the teeth of the rotor 14 creating non sinusoidal flux linkages (not shown), and these linkages, when rotated, induce a voltage in the stator windings (not shown). It should be further appreciated that, according to Faradays law of induction, induced voltage is proportional to the rate of change of flux.

Therefore, all induced voltages, including the harmonics scale linearly with speed is proportional to the rate of change of flux. Another known source of current harmonics is if the stator inductance changes with the field current 49. As such, the induced voltage may be due to the flux built in the reluctance path within the machine, which may be the same reluctance path that also determines the stator $L_d$ and $L_q$. Therefore, if the BEMF is not sinusoidal, then the inductance will not be constant. To adequately deal with the harmonics, both the BEMF and the changing inductance needs to be fed forward. The harmonics generated by changing inductance are due to the equation:

$$V = \frac{Ldi}{dt}.$$

Thus, even if the current intended to be sinusoidal, if the inductances are changing, in order to keep the current sinusoidal, the applied voltage may not be sinusoidal. Therefore, if the inductances are changing, to keep the current sinusoidal, the right voltage vector may be applied by the right angle based on the actual current. It should be noted that the voltage and current in an inductance are 90 degrees apart such that the voltage leads the current. Therefore, in a vector, Iq current needs voltage vectors in d because of the 90 degree angle difference. As a result, both the BEMF and the changing inductance may need to be fed forward into the FOC control system 10.

Now referring to FIG. 3, a method 300 of determining the model table 72b by the correction algorithm 72c will be described. The model table 72b and the correction algorithm 72c establish the correct command voltages that are inserted into the FOC control system 10 as the first feed forward term 31 and the second feed forward term 33. To establish the model table 76b, the BEMF 98, 100 of one electrical cycle is captured at a known rotating speed, at 302. It should be appreciated, but not limiting, that the BEMF 98, 100 may be measured from three main sources: (1) Simulation data from a tool such as Ansys Maxwell; (2) Measured directly from a single machine; and/or (3) Measured directly as part of the system end of line test/calibration process.

Figure 3:
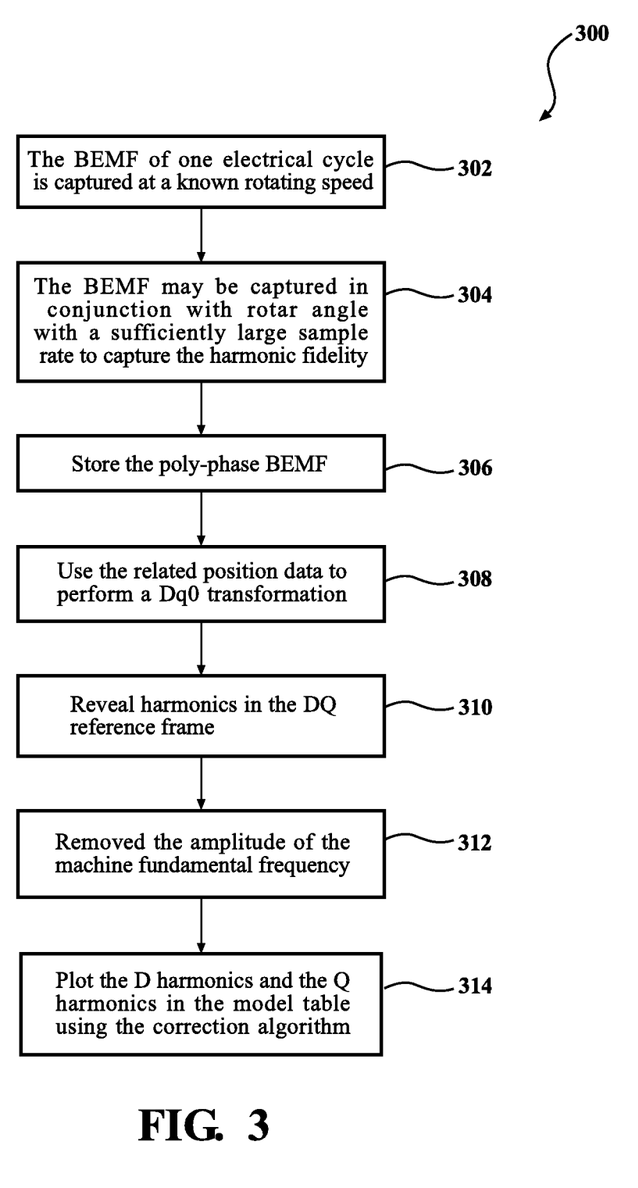
FIG. 3 schematically depicts a flowchart of a method for determining the model table by the correction algorithm according to one or more embodiments shown and described herein.

Referring to FIG. 3, the BEMF 98, 100 may be captured in conjunction with field current 49 with a sufficiently large sample rate to capture the harmonic fidelity, at 304. Moreover, it should be appreciated that if the poly-phase electric machine 12 is externally excited, such as seen in a Claw pole alternator, and, if the field current 49 has significant effect on harmonic content, such as saturation effects, then several back EMF samples may be captured over the expected range of field currents 49. Once the poly-phase back EMF has been captured and stored, at 306, use the related position data to perform a DQ0 transformation, at 308, which reveals the harmonics in the DQ reference frame, at 310. Then the "DC quantities" may be removed as these represent the amplitude of the machine fundamental frequency, at 312. The resulting graph 400 (FIG. 4) is the example observational plot of the D harmonics and the Q harmonics, which are inserted into the correction algorithm 72c such that the model table 72b may be created by plotting the first feed forward term 31 and the second feed forward term 33, at step 314, as discussed in greater detail below. The model table may also correlate the correction for the D harmonics and/or the Q harmonics based on the rotor position.

Figure 4:
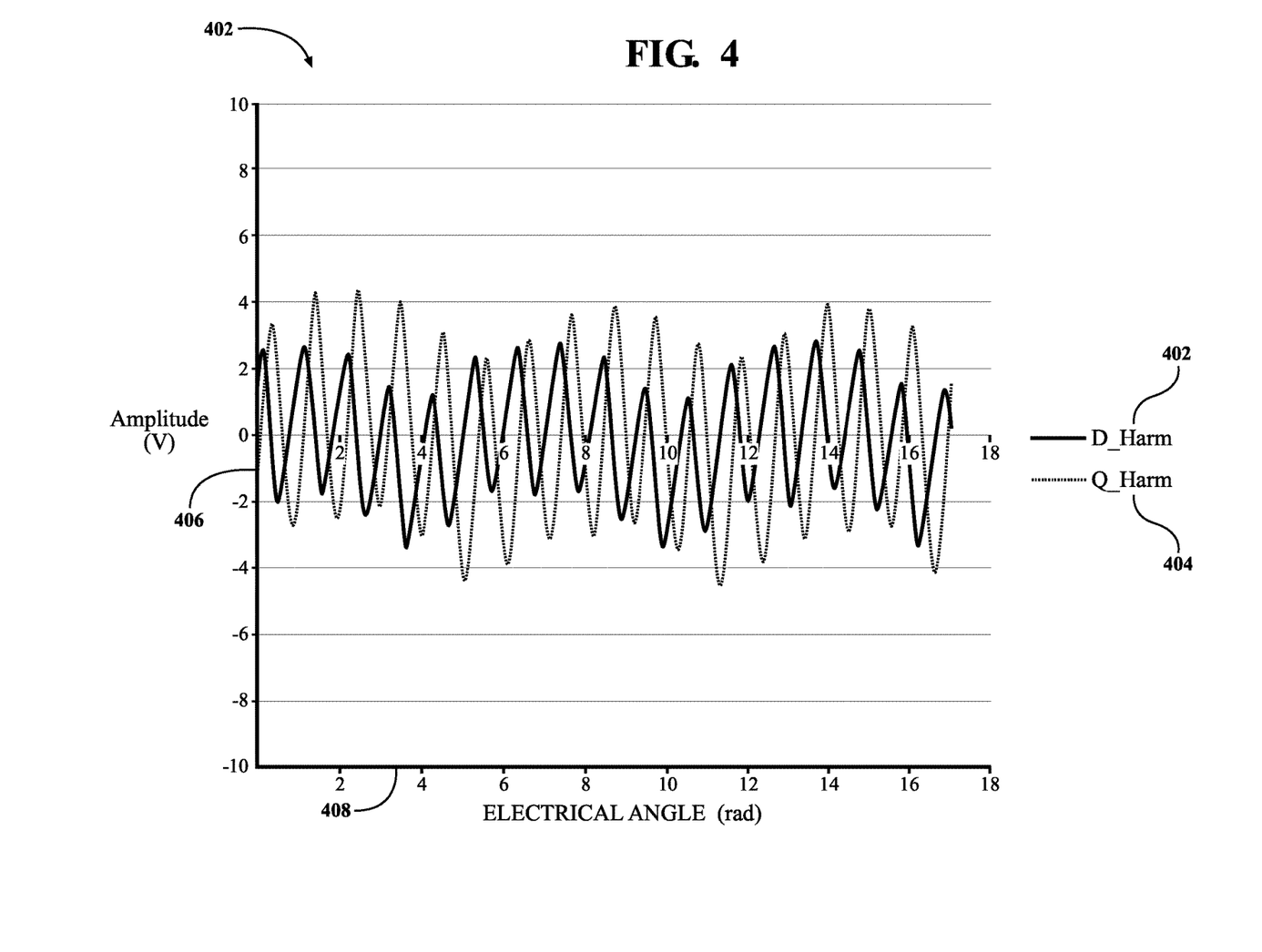
FIG. 4 schematically depicts a plot graph of the D-harmonics and the Q-harmonics having the DC quantities removed according to one or more embodiments shown and described herein.

With reference still to FIG. 3 and now to FIG. 4, a graph 400 of the D-harmonics 402 and the Q-harmonics 404 with the "DC quantities" removed is schematically depicted. The abscissa coordinate of the graph represents the Amplitude in volts 406 and is depicted in a range from −10 volts to +10 volts, however this is by way of example and is non-limiting. The ordinate coordinate represents the electrical angle in radians 408. The graph is depicted from 0 radians to 18 radians, however this is merely for example and should not be limiting. As illustrated, the D-harmonics 402 are illustrated with a solid line and the Q-harmonics 404 are illustrated with a dashed line. Both the D-harmonics and the Q-harmonics oscillate about the zero amplitude line going from positive to negative. Further, Q-harmonics may have a larger amplitude than the D-harmonics. Moreover, the Q-harmonics and the D-harmonics may be offset from one another by 90 degrees, as discussed above.

With reference to FIGS. 3 and 4, and as discussed above, the model table 72b is populated with the D-harmonics 402 and the Q-harmonics 404 input into the FOC algorithm such that the graph 400 is the observational model graph for the harmonic distortion. That is, for this particular poly-phase electric machine 12, and all other poly-phase electric machines 12 within a predetermined tolerance, the model table 72b populated by the D-harmonics and the Q-harmonics as input into the correction algorithm 72c such that, based on the rotor position 16 (FIG. 1) and/or the field current 49, or rotor angle (FIG. 1), the appropriate feed forward terms or command voltages are inserted into the FOC control system 10.

The correction algorithm 72c calculates and populates the model table 72b with the first feed forward term 31, or first command voltage (D-Harmonic correction) and the second feed forward term 33, or second command voltage (Q-harmonic correction) with the following equation:

$$Ucorrect(\text{electrical}_{angle}) =$$
$$\text{scalar}(V) \times rpm_{mult} \times BEMF(\text{electrical}_{angle}, i_{field}) +$$
$$\text{scalar}(I) \times I(dq) \times \omega \times L(\text{electrical}_{angle}, i_{field}).$$

In which, scalar (V) and scalar (I) is equal to values to scale the physical quantities calculated in the expression such as currents, inductances, and/or the like, to a value that works in the microcontroller 19, while taking into account the FOC control system 10 gains number conversions in the digital space. Further, $$Rpm_{mult} = \frac{rpm}{ref_{rpm}}$$

in which the Rpm is equal to the rotating speed (differentiate position vector), $ref_{rpm}$ is the speed of the BEMF reference. Moreover, $i_{field}$=excitation current. The electrical$_{angle}$ is equal to a current instantaneous machine position (FOC variable). The BEMF(electrcial$_{angle}$,i$_{field}$) is equal to a function that returns the volt vectors for a given electrical$_{angle}$ and a given field current (flux harmonics).

The electrical frequency of the poly-phase electric machine 12 is calculated with the following equation:

$$\omega = \frac{rpm \times pole_{pairs}}{60}$$

Finally, L(electrical$_{angle}$i$_{field}$) is equal to a function that returns the inductance value of the stator for d or q for a given angle and field current. It should be appreciated that while only one equation was provided, the equations for both the D,Q would be the same expect performed on the two orthogonal vectors.

The model table 72b, lookup table, model, equation, or the like and the correction algorithm 72c may function by providing two voltage values, the BEMF Ud 98 and the BEMF U$_q$ 100, based on the position of the rotor 14, transmitted as rotor position 16, and the field current 49. The model table 72b may provide a normalized value of D and Q harmonic values at each rotor position. As such the model table 72b may be fed the rotor position (and field current if applicable) that correlate to two numbers representing the amplitude of the D and Q harmonics at that angle, which will now be described in detail. As such, the microcontroller 19 provides the appropriate feed forward terms 31, 33 to the FOC control system's 10 for the PI controllers outputs 27, 29 at the signal correction junctions 35, 37. As a result, traditional methods of using the PI controllers outputs 27, 29 to attempt to control the harmonics is not needed such that the FOC loop does not need to be able to compensate for the harmonics.

Now referring to FIG. 5, a method 500 of correcting the non-sinusoidal BEMF voltages generated by poly-phase electric machines 12 will be described. As discussed above, the input module 76 receives a plurality of signals into the microcontroller 19. When the poly-phase electric machine 12 is activated, at 502, the microcontroller 19 analyzes the rotor position 16, the rotor flux component I$_d$ 46, the rotor torque signal I$_q$ 48, and/or the field current 49 or angle of the rotor 14, at 504. The flux vectors of the BEMF U$_d$ 98 and a torque vectors of the BEMF U$_q$ 100 are extracted, at step 506, indicating the rotation of the rotor 14 of the poly-phase electric machine 12 and the rotor speed of the poly-phase electric machine 12.

Figure 5:
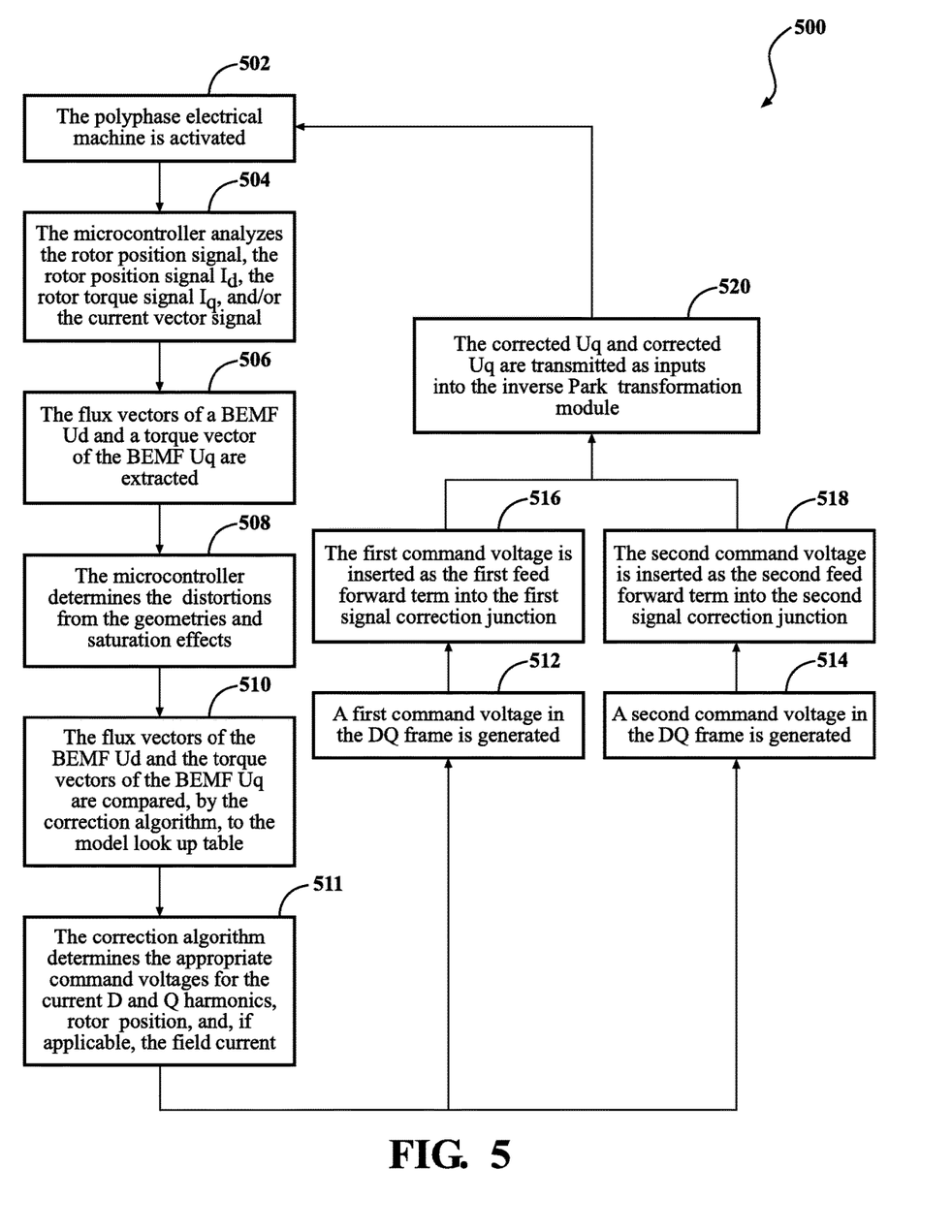
FIG. 5 schematically depicts a flowchart of a method for correcting the non-sinusoidal back electromotive force voltages generated by poly-phase electric machines, according to one or more embodiments shown and described herein.

With reference to FIG. 5, the microcontroller 19 determines the distortions from the geometries and saturation effects, at 508. The flux vectors of the BEMF U$_d$ 98 and the torque vectors of the BEMF U$_q$ 100 are compared, by the correction algorithm 72c, to the model table 72b, at 510. The correction algorithm 72c determines the appropriate command voltages for the current D and Q harmonics 402, 404 (FIG. 4), based on the current D and Q harmonics, the rotor position 16, and, if applicable, the field current 49, at 511. As such, the model table 72b provides a first command voltage value in the DQ frame, which correlates to the flux vectors of the BEMF U$_d$ 98 and the rotor position 16 and a second command voltage in the DQ frame which correlates to the torque vector of the BEMF U$_q$ 100. The first command voltage value in the DQ frame is generated, at 512. The second command voltage in the DQ frame is generated, at 514.

The first command voltage value for the flux vectors of the BEMF U$_d$ 98 is inserted, as the first feed forward term 31, into the first signal correction junction 35, at 516. The first feed forward term 31 corrects the controlled flux component output U$_d$ 27 of the first PI controller 30. The second command voltage value for the torque vectors of the BEMF U$_q$ 100 is inserted, as the second feed forward term 33, into the second signal correction junction 37, at 518. The second feed forward term 33 corrects the controlled torque component output U$_q$ 29 of the second PI controller 34. The corrected U$_d$ 28 and corrected U$_q$ 32 are transmitted into the inverse Park transformation module 20 at 520. This process of the correction algorithm 72c determining the harmonics, using the model table 72b to determine the value based on the harmonics and the rotor position and transmitting the appropriate feed forward terms 31. 33 is repeated while the poly-phase electric machine 12 is activated, at 502.

Still referring to FIG. 5, the first feed forward term 31 and the second the second feed forward term 33 prevents the BEMF voltages (U$_d$ and U$_q$) from generating a non-sinusoidal current over the operating range of the poly-phase electric machine 12 thereby maintaining the controlling quantities for the PI controllers 30, 34 loops in the DQ plane as DC values.

It should be appreciated that the process depicted in FIG. 5 indicates that the process is only in a single direction. However, this is for illustrative purposes merely to explain a single iteration or loop of the program. It should be appreciated that the process continuous loop through a plurality of iterations. It should also be appreciated that these are merely examples of using a model table 72b and that, as discussed above, there are other ways of determining and correcting harmonics in the FOC control system 10.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for correcting harmonic distortions in an output from an electrical machine, the system comprising:
   an electrical machine having a rotor, the electrical machine producing a first electrical output, the rotor having a position output;
   a pair of proportional-integral-derivative controllers, the pair of proportional-integral-derivative controllers receive the first electrical output, the proportional-integral-derivative controllers having a second electrical output; and
   a microcontroller having a model table and a correction algorithm, the-microcontroller analyzes a plurality of back electromotive force voltages such that the flux vectors of the plurality of back electromotive force voltages are extracted, the microcontroller configured to receive a machine current vector from the electrical machine and configured to receive the first electrical output,
   the microcontroller correlates the model table based on the machine current vector and the first electrical output and correlates the position output with a value in the model table;
   the microcontroller transmits a first feed forward term and a second feed forward term, each having a correction voltage,
   wherein, the first feed forward term and the second feed forward term are inserted into the second electrical output of the pair of proportional-integral-derivative controllers such that the correction voltage transmitted by the microcontroller into the second electrical output eliminates the harmonics in the electrical machine.

2. The system of claim 1, wherein the electrical machine transmits a field current, the microcontroller correlates the field current with the position output such that the corresponding model table value can be transmitted by the correction algorithm as the first feed forward term and the second feed forward term.

3. The system of claim 1, wherein the model table is a look-up table.

4. The system of claim 1, wherein the machine current vector is the sum of a rotor flux signal and the rotor torque signal in a rotating DQ plane.

5. The system of claim 1, wherein the microcontroller determines the first feed forward term and the second feed forward term based on the value in the model table which correlates to the machine current vector, the position output, and the flux vectors of the plurality of back electromotive force voltages.

6. The system of claim 1, wherein the pair of proportional-integral-derivative controllers includes a first proportional-integral-derivative controller and a second proportional-integral-derivative controller, the first proportional-integral-derivative controller transmits a first controller output, the second proportional-integral-derivative controller transmits a second controller output.

7. The system of claim 6, wherein the first feed forward term is inserted in the first controller output and the second feed forward term is inserted into the second controller output.

8. The system of claim 1, wherein the electrical machine is a poly-phase electrical machine.

9. A method for determining a model table, the method comprising:
  analyzing, by a microcontroller, a rotor position signal, a rotor flux position signal and a rotor torque signal in the DQ plane, and a field current;
  capturing a back electromotive force of one electrical cycle sample at a known rotating speed in conjunction with the field current over a predetermined sample rate;
  determining, by the microcontroller, from the sample, a harmonic content of the back electromotive force;
  performing a direct-quadrature-zero transformation using the rotor position signal to reveal a plurality of harmonics remaining in the DQ reference frame;
  removing the machine fundamental frequency such that only the plurality of harmonics remain in the DQ reference frame,
  wherein the plurality of harmonics remaining in the DQ reference frame are transformed by a correction algorithm of the microcontroller such that the model table is populated with the rotor position signal and two voltage values that correspond to the plurality of harmonics remaining in the DQ reference frame for that specific rotor position.

10. The method of claim 9, wherein when a poly-phase electric machine is externally electrically excited and the field current has effect on saturation effects, the added step of capturing of the back electromotive force of one electrical cycle sample at the known rotating speed in conjunction with the field current sample over the predetermined sample rate and the sample captured is over the expected range of field currents.

11. The method of claim 9, wherein a poly-phase electrical machine transmits a field current, the microcontroller correlates the field current with the values in the model table having the corresponding rotor position signal and the corresponding two voltage values.

12. The method of claim 11, wherein the two voltage values are transmitted by the correction algorithm as the first feed forward term and the second feed forward term.

13. The method of claim 9, wherein the model table is a look-up table.

14. A method for correcting harmonics in an electrical machine, the method comprising:
  analyzing, by a microcontroller, a stator current and a back electromotive force voltages;
  extracting a pair of flux vectors of a back electromotive force indicating the rotation of the electrical machine and the machine speed;
  determining the distortions from the geometries and saturation effects;
  transmitting, by the microcontroller, the pair of flux vectors of the back electromotive force into a correcting algorithm;
  developing a command voltage in a DQ frame that correlates to the pair of flux vectors of the back electromotive force; and
  inserting the command voltage, by the microcontroller, into a control output of a current proportional-integral-derivative controller as a correction signal,
  wherein the correction signal prevents the back electromotive force voltages from generating a non-sinusoidal current over the operating range of the machine thereby maintaining the controlling quantities for a proportional-integral-derivative controller loops in the DQ plane as DC values.

15. A system for correcting harmonic distortions in an output from an electrical machine, the electrical machine producing a first electrical output, the system comprising:
  a pair of proportional-integral-derivative controllers, the pair of proportional-integral-derivative controllers receive the first electrical output, the proportional-integral-derivative controllers having a second electrical output; and
  a microcontroller having a model table and a correction algorithm, the microcontroller configured to receive a machine current vector from the electrical machine and configured to receive the first electrical output, the machine current vector is a sum of a rotor flux signal and a rotor torque signal in a rotating DQ plane;
  the microcontroller correlates the model table based on the machine current vector and the first electrical output, the microcontroller transmits a first feed forward term and a second feed forward term, each having a correction voltage,
  wherein, the first feed forward term and the second feed forward term are inserted into the second electrical output of the pair of proportional-integral-derivative controllers such that the correction voltage transmitted by the microcontroller into the second electrical output eliminates the harmonics in the electrical machine.

16. The system of claim 15, wherein the electrical machine includes a rotor, the rotor having a position output, the microcontroller correlates the position output with a value in the model table such that the value in the model table is incorporated into the correction voltage of the first feed forward term and the second feed forward term.

17. The system of claim 16, wherein the electrical machine transmits a field current, the microcontroller correlates the field current with the position output such that the corresponding model table value can be incorporated into the correction voltage and transmitted by the microcontroller as the first feed forward term and the second feed forward term.

18. The system of claim 15, wherein the model table is a look-up table.

19. The system of claim 15, wherein the microcontroller analyzes a plurality of back electromotive force voltages such that the flux vectors of the plurality of back electromotive force voltages are extracted.

* * * * *